(12) United States Patent
Lehmberg et al.

(10) Patent No.: US 6,423,362 B1
(45) Date of Patent: *Jul. 23, 2002

(54) HEATED STORAGE SOLUTION

(75) Inventors: Gregg Lance Lehmberg, Westfield; Martin John Spisak, Parlin; Steven Alphonse Gobbo, Secaucus; Meghan Mary Kemly-Ellingham, Harrington Park, all of NJ (US); Clive Stanbra Harris, Riseley (GB)

(73) Assignee: Lipton, Division of Conopco, Inc., Englewood Cliffs, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/500,895

(22) Filed: Feb. 9, 2000

Related U.S. Application Data
(60) Provisional application No. 60/119,806, filed on Feb. 12, 1999.

(51) Int. Cl.$^7$ .................................................. A23F 3/00
(52) U.S. Cl. ...................................................... 426/597
(58) Field of Search ......................................... 426/597

(56) References Cited

U.S. PATENT DOCUMENTS

| | | | |
|---|---|---|---|
| 4,478,939 A | | 10/1984 | Adler-Nissen et al. |
| 4,483,876 A | | 11/1984 | Petersen |
| 5,445,836 A | * | 8/1995 | Agbo et al. |
| 5,780,086 A | * | 7/1998 | Kirksey et al. |
| 6,024,991 A | * | 2/2000 | Lehmberg et al. |
| 6,036,982 A | * | 3/2000 | Lehmberg et al. |

* cited by examiner

*Primary Examiner*—Anthony J. Weier

(57) ABSTRACT

This invention discloses the usage of the heated concentrates or storage solutions containing relatively high concentrations of tea solids. This heating is done prior to dilution with cold water to prepare tea beverages and, preferably, at the times of dilution.

8 Claims, 3 Drawing Sheets

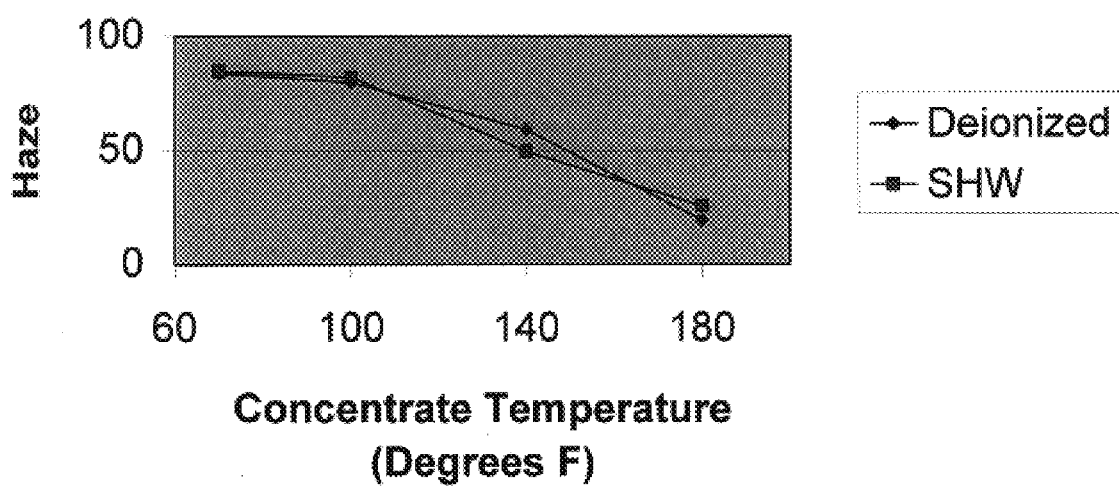

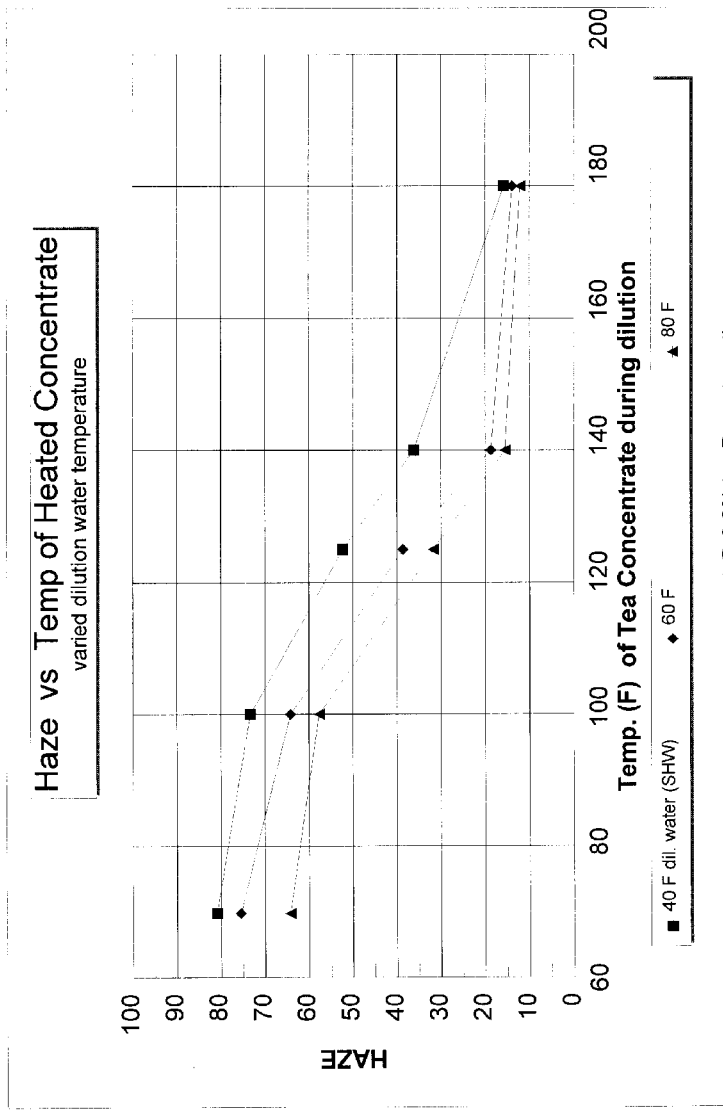

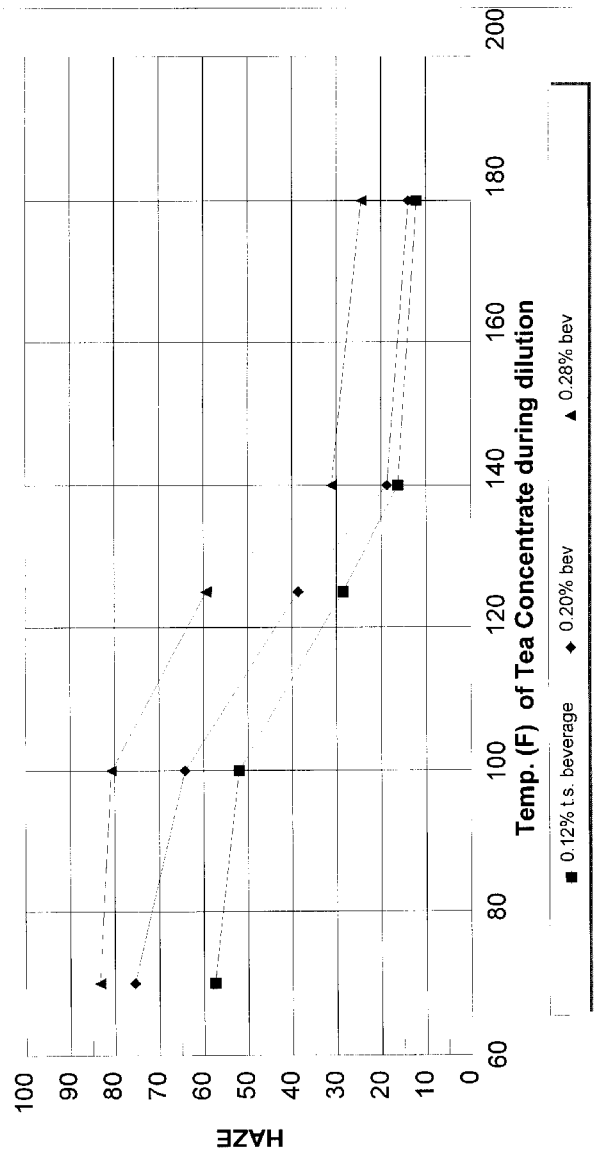

HEATED STORAGE SOLUTION

This application claims the benefit of U.S. Provisional Application Ser. No. 60/119,806, filed Feb. 12, 1999.

This invention relates generally to a process for preparing diluted beverage strength teas from a brewed tea "concentrate" or storage solution. The concentrate may be diluted and used if desired to prepare iced tea or hot tea beverages.

In many situations concentrated solutions of tea are desirable to simplify shipping and packaging costs and to deliver a beverage with brewed tea flavor without the actual requirement of having to freshly brew tea.

Dilute tea extracts, have been used in Food Service applications for years and relatively low concentration storage solutions have been employed, usually at a level of about 0.5% to 1.0% tea solids. There is no difficulty diluting these low concentration storage or tea extract solutions with water to form iced tea beverages. Generally the storage solutions are held at room temperature and mixed with cold water to form a beverage strength drink. In the case of iced tea, ice then may be added to form the final beverage.

Iced tea cannot be conveniently prepared by infusing traditionally manufactured tea leaves in cold water. Instead, the leaves are usually infused in hot water, removed, if necessary unless they are in a tea bag, and the beverage is then refrigerated until it is ready to consume. Alternately tea leaves, both loose and in bags, have been placed in water in sunlight to infuse slowly over a period of hours. A more convenient option is to prepare the iced tea beverage from a concentrated or storage solution.

Shelf stable tea concentrates used to prepare these iced tea beverages are highly desirable and have several applications. These include: the ability to supply a brewed tea concentrate for uses in the Ready-to-Drink tea and Fountain tea products; as a tea concentrate product for retail sale; and as a preferred method of transporting tea solids. One advantage of the tea concentrate of the invention over a powder or a dilute tea extract is that better tea character is obtained. In addition, less energy is employed in manufacturing than for a powder and less weight and volume are needed for shipping a concentrate than for a dilute extract.

In the prior art, tea concentrates were considered to be physically unstable, which prevented their use in many tea products. However, it is believed that under certain conditions tea products made from tea concentrates have better quality (e.g., flavor, freshness, etc.) than powders and are more economical than tea powder or dilute tea extract. Therefore, it is highly desirable to have a shelf stable tea concentrate and consequently to have a method of preparing beverage strength iced tea of high quality and good clarity from these concentrates is also required.

A method of diluting these highly concentrated storage solutions while still retaining the stability of a less concentrated storage solution is thus seen to be desirable.

The present invention has discovered that if the concentrate is heated to an elevated temperature before dilution then the Hunter Haze Value measured with a Hunter DP 9000 Spectrophotometer at 60° F. in a 5 cm. cell of the final beverage strength product can be dramatically reduced. In addition it has been discovered that the use of de-ionized or treated water instead of tap water also improves the haze value of the final product but that this effect evens out at higher temperatures. The accompanying figure shows that heating the concentrate to a temperature of about 160° F. or higher slightly before or during dilution results in a Hunter Haze Value in the final beverage of less than 50 which is required in a final consumer product. This beverage contains about 0.1% to 0.35% tea solids

BRIEF DESCRIPTION OF THE DRAWINGS

FIG. 1 shows the results of Example 1 with regard to haze as it relates to the temperature of the heated concentrate.

FIG. 2 shows the results of Example 2 with regard to haze as it relates to the temperature of the heated concentrate.

FIG. 3 shows the results of Example 3 with regard to haze as it relates to the temperature of the heated concentrate.

EXAMPLE 1

The haze value of final beverages prepared from concentrate were measured in a Hunter Lab DP 9000. The temperature of the concentrates at the time of dilution range from room temperature (about 70° F.) to about 180° F. with both synthetic hard water (178–181 ppm as $CaCO_3$) and de-ionized water. The dilution fraction was 1 part concentrate to 100 parts of water at 60° F. The results are shown graphically in FIG. 1 and repeated in Table 1 below:

TABLE 1

Haze Value of Beverage Prepared from Heated Concentrates

| Concentrate Temp | De-ionized Water 60° F. | Synthetic Hard Water 60° F. |
| --- | --- | --- |
| 70° F. | 83.9 | 84.9 |
| 100° F. | 79.9 | 82.2 |
| 140° F. | 59.3 | 49.7 |
| 180° F. | 19.6 | 25.9 |

EXAMPLE 2

An additional experiment was run on the same tea concentrate of Example 1. This shows that the haze decreases as the temperature of the tea concentrate is increased during dilution regardless of the temperature of the dilution water. Good results can also be achieved by varying both temperatures. This experiment was run with synthetic hard water as in Example 1. The results are shown graphically in FIG. 2 and repeated in Table 2 below.

TABLE 2

| Tea Conc. Temp | 40 F. dil. water (shw) | 60 F. dil. water (shw) | 80 F. dil. water (shw) |
| --- | --- | --- | --- |
| 70 | 80.9 | 75.5 | 64.2 |
| 100 | 73.3 | 64.2 | 57.7 |
| 125 | 52.3 | 38.6 | 31.7 |
| 140 | 36.2 | 18.7 | 15.5 |
| 180 | 15.8 | 13.9 | 12.1 |

EXAMPLE 3

An experiment was run on the same tea concentrate as in Example 1 but the tea solids of the final beverages were varied. Synthetic hard water as in Example 1 was used for dilution. The haze decreases as the temperature of the tea concentrate is increased during dilution over a range of tea strength in the final beverage. The results are reported graphically in FIG. 3 and in Table 3 below.

TABLE 3

| Tea conc. temp | 0.12% t.s. bev 15 C. (SHW) | 0.20% t.s. bev 15 C. (SHW) | 0.28% t.s. bev 15 C. (SHW) |
| --- | --- | --- | --- |
| 70 | 57.6 | 75.5 | 83.4 |
| 100 | 52.0 | 64.2 | 80.7 |
| 125 | 28.5 | 38.6 | 59.4 |
| 140 | 16.2 | 18.7 | 31.1 |
| 180 | 12.1 | 13.9 | 24.4 |

The concentrate used is a relatively highly concentrated tea solids solution or dispersion.

In order to achieve the goal of shelf stable tea concentrates which can then be employed with the invention, selected amounts of carbohydrates such as sucrose, corn syrup, high fructose corn syrup, oligosaccharides and the like have been employed. High fructose corn syrup has been found to be the most effective carbohydrate.

Tea extracts from continuous or batch extraction using specific enzyme treated or extracted tea leaves (i.e., green, black and oolong tea) may be employed. The extracts are preferably centrifuged and then concentrated by, for example, evaporation. The carbohydrate is added either before or after evaporation and preferably after to achieve a final concentration of, preferably, 12 to 20% (w/w) on a tea solids basis of the concentrate. A shear force is used to mix the concentrate. The stabilized concentrate is pasteurized, aseptically packed or preserved and acidified to a pH below 4.6, and stored at ambient temperature. Products made from the concentrate have a fresh brewed tea flavor and good clarity.

The concentrate used with the invention has a concentration of brewed tea solids of about 5% to 30%, preferably 12% to 20%, and employs a companion carbohydrate such as sucrose, or preferably, corn syrup or high fructose corn syrup preferably with a DE of 42 or 55, so that the ratio of carbohydrate solids to tea solids is about 1 part carbohydrate to 1 part tea solids to about 2 or more parts carbohydrate to 1 part tea solids and, preferably, at least 1.5 parts carbohydrate to 1 part tea solids. The carbohydrate should be of a type and at a level such that it does not impart significant sweetness when the concentrate is diluted to the beverage strength drink. Other materials may also be used but the total solids (solute) concentration including tea, HFCS, or other carbohydrate, and any other additives such as acidulants, preservatives and colorants, if desired, to ensure stability is preferably at least about 45% or preferably higher. Lower amounts may also be used of 30 to 45% but the stability will be affected. In order to insure the microbiological stability of the storage solution or "concentrate", a pH of about 4.6 or lower is used. This may contribute to the physical instability of the concentrate. Of course, if the tea concentrate is processed thermally and aseptically packaged, a higher pH such as the native pH of tea of about 5.0 or higher may be used instead of a pH of 4.6 or less.

The preferred preservatives are sorbate and benzoate, preferably sodium benzoate and potassium sorbate but any preservatives commonly used in tea beverage may be used. Typical beverage strength iced teas prepared from current fountain tea dilute extracts contain about 100–200 ppm each of sorbate and benzoate because of the lower amount of total solids in the extract of the art, but the concentrate of the invention which is roughly 20 times more concentrated reduces this level in the beverage strength to about 10 to 12 ppm. Lower amounts of preservatives in the final beverage are beneficial for taste.

The viscosity of the brewed tea concentrate of the invention is 10 to 200 centipoise as measured by a Brookfield LVT Viscometer with a #2 spindle at 60 rpm and 25° C. temperature. Further, this brewed tea concentrate must produce a "brewed" tea flavor as judged by trained tea tasters when diluted to a level of about 0.2% tea and must also have a Hunter haze value of 50 or less as measured on a Hunter DP9000 spectrophotometer in a 5 cm. cell.

Based on the solids concentration, including tea solids, HFCS, or other carbohydrate, and other desired ingredients, the specific gravity of the concentrate will vary between about 1.21 g/cc and about 1.32 g/cc.

Further, the concentrate of the invention must be made from real tea and must contain about 0.4% to 2.0% caffeine, about 3.0% to 11.0% flavanoids, and about 0.3% or higher gallic acid.

The shelf life and consequently the physical stability of the storage solution or "concentrate" must be at least about 9 weeks when stored at a temperature of about 70° F.

The tea extract used in the concentrate can be produced by any convenient process but it is especially preferred to employ tea with selected cell wall digesting enzymes such as viscozyme. The prepared tea will also be clarified by standard means but preferably in a centrifuge at native pH of 5.0 or below and at a solids concentration of 4 to 15%. As mentioned above, any process will be operative but to insure low haze and increased stability the process employing cell wall digesting enzymes is preferred.

Black teas, particularly those selected to have a low cream index and which produce highly colored infusions are essentially preferred for the concentrate but, of course, Green and Oolong teas may also be employed if appropriate care is taken.

Particularly preferred are tea concentrates prepared from black tea treated with a combined enzyme system of at least one cell wall digesting enzyme.

In particular these concentrates are prepared by treating tea leaf with an enzyme cocktail including selected cell wall lysis enzymes such as carbohydrases including cellulase and mascerase, for example, Viscozyme™ L obtainable from NOVO Industri A/S Denmark.

The enzymes are fed to a black tea/water slurry in an extractor at low temperature to obtain a tea extract slurry. The enzymes, if more than one is used, can be combined into a cocktail or can be fed to the extractor individually. The tea extract slurry containing the enzymes is then hot extracted to complete the extraction process and the tea leaf is separated from the tea extract. The tea extract is then preferably pasteurized. This heat treatment deactivates the enzymes. The extract may then be stripped if desired.

The stripped extract is optionally concentrated and then cooled and clarified by centrifugation or other clarification methods such as filtration and the like. After clarification, the extract is then concentrated, preferably by vacuum.

Generally about 5 to 20 parts and preferably 5 to 8 parts by weight of water based on the weight of tea leaf is heated to between about 70° F. and 145° F., preferably 120° F. to 140° F. The water is added to the tea leaf and an enzyme mixture consisting of any combination of cell wall lysis enzymes, for example carbohydrases such as cellulase, pectinase, and mascerase are metered continuously into the extractor. The extractor can be jacketed or insulated to aid in temperature control. The flow of tea leaf, water and enzymes through the extractor is preferably co-current. The length, diameter and flow rates of the system are such that they provide a minimum contact time of at least 20 minutes, preferably at least 60 minutes. The maximum is about 2 to 5 hours or more, depending upon the degree of extraction desired balanced against economics.

The resulting slurry can be separated into extracted tea leaf and extract or be sent on for further batch or continuous higher temperature extraction. The extract is then optionally aroma stripped by conventional means and adjusted to the desired solids level, cooled and centrifuged to remove insoluble material. The extract is then concentrated to about 30% tea solids or higher for batching with other ingredients to form the final storage solution or concentrate.

Enzyme Preparation

The enzyme cocktail, if more than one enzyme is used, is prepared by mixing selected cell wall-digesting enzymes together with enzyme stabilizing agents such as sorbitol and the like in water. Then enzymes may be mixed together. It is also possible to introduce the enzyme separately into the extractor.

Enzyme Extraction Operation

The tea leaf is fed to the enzyme extractor together with fresh water and enzyme solution. All three components flow co-currently through the extractor. Other methods of delivering an appropriate residence time are also acceptable. The extractor is preferably temperature controlled by jacketing or the like.

The enzyme extractor preferably provides about 20 minutes to about 5 or more hours of residence time for the enzyme solution to be in contact with the leaf. Temperature control is important to maximize the effect of the enzymes.

Extraction

Following the enzyme extraction step, the leaf slurry is fed into an extractor at a temperature of about 70° F. to 210° F., preferably 100° F. to 190° F. This completes the extraction of the leaf. The ratio of leaf to water in this extraction is about 4 parts to 10 parts water to 1 part leaf.

Pasteurization

If pasteurization is desired, decanted extract from the hot extraction step is pumped at about 2% to 5% tea solids to the Pasteurizer. Pasteurization is accomplished by raising the temperature of the extract to a minimum of about 190° F. The hot extract is then held for about one to ten minutes of residence time to destroy any microorganisms that might be present in the extract. The pasteurization step also denatures the enzymes and stops their activity.

The pasteurized extract is then stripped of aroma if desired and concentrated to the appropriate level for centrifugal clarification.

Centrifuge Operation

The extract temperature should be about 140° F. or less, preferably about 55° F. to 90° F. The extract is fed to a centrifuge where it is spun for nominally 2 minutes at approximately 8,000 times gravity. The sludge is disposed of and the clarified extract retained for concentration. The extract is centrifuged at about 4% to about 15% tea solids at a pH of about 5.0 or less.

Preferred Embodiment

In a preferred process of this invention, black tea leaf is mixed with an enzyme cocktail at a weight ratio of from about 0.005 to 0.010 part of enzyme to 1 part of tea leaf preferably 0.007 to 0.008 parts enzyme per part tea leaf. The enzyme solution contains one or more cell lysis enzymes. Preferably, the enzyme solution contains from about 0.33 to 0.66 FBG of carbohydrase per gram of black tea. The tea is extracted with the enzymes at a temperature of from 70° F. to about 145° F. for from 20 minutes to 5 hours or more. The enzymes are inactivated by heating to a temperature greater than about 150° F. and preferably about 190° F. or above and the tea is then ready for further processing in accordance with the invention. Conventional extraction, aroma stripping, pasteurization and centrifugation are employed.

Enzyme Solution

By "cell wall-digesting enzyme" herein is meant an enzyme or enzymes which breaks down one or more tea cell wall constituents to simpler materials and thus reduces the structural integrity or increases the permeability of the cell wall. Plant cell walls are composed primarily of cellulose, but contain lesser amounts of proteins, hemicellulose, pectins, and lipids. Accordingly, cell wall-digestive enzymes include carbohydrases such as cellulase, hemicellulase, pectinase and extranase as well as protease, lysozyme and lipases, for example, NOVO Industries' U.S. Pat. Nos. 4,478,939 and 4,483,876 describe SPS-ase activity. The cell wall digesting enzymes, such as cellulase, pectinase, and hemicellulase can be obtained from commercial enzyme sources.

One cell wall digesting enzyme is Viscozyme™ obtainable from NOVO. Viscozyme 120 L is a multi-enzyme complex containing a wide range of carbohydrases including arabinose, cellulase, β-glucanase, hemicellulase and xylanase. The enzyme also has activity against the branched pectin like substances found in the soy bean cell walls.

The enzyme preparation is produced from a selected strain of the Aspergillus group. The product has an enzyme activity of 120 FBG/ml. (Fungal β-Glucanase). The analytical method is available from NOVO.

Once the clarified tea extract has been prepared by the enzymatic treatment, it is then concentrated by means well known in the art. Preferably the concentrates are prepared by evaporation under vacuum. The preferred conditions if evaporation is used are a temperature of about 115° F. to 195° F. and a pressure of about 1.5 psia to about 10 psia. In this way the extract can be concentrated without having a negative impact on the organoleptic properties of the tea. A commercial rising or falling film evaporator is usually employed. Once the tea is concentrated to an appropriate level, a selected carbohydrate is then added to stabilize the concentrate.

The tea extract can be concentrated to any level which is high enough to achieve the desired tea solids concentration in the final storage solution or concentrate and low enough to still be fluid enough to be workable. Levels of about 30% or higher and preferably about 45% or higher to about 70% are preferred for ease of handling.

As used herein, the terms "tea concentrate solution" refers to a product derived from concentrated tea extract which is diluted with water to form a drinkable tea beverage. Tea concentrates of the present invention comprise from about 5% to about 30% tea solids. Preferred tea concentrates of the present invention comprise from about 12% to about 20% by weight tea solids. The tea concentrates of the present invention are in liquid product form.

As used herein, the term "tea beverage" refers to a drinkable beverage prepared from the tea concentrates of the present invention by dilution with water. The dilution water is usually municipal water, but deionized water can be used to advantage. If the municipal water has a hardness of over about 200 ppm as $CaCO_3$, the haze of the beverage may be adversely affected so caution is required. Concentrates of the present invention are generally diluted with sufficient water to provide the tea beverage. Preferred tea concentrates are typically diluted to about 0.1% to 0.35% tea solids to provide the tea beverages.

As used herein, the term "tea solids" refers to those solids normally present in a tea extract. Polyphenolic compounds are normally the primary component of tea solids. However, tea solids can also include caffeine, proteins, amino acids, minerals and carbohydrates.

As used herein, the word "comprising" is intended to mean including but not necessarily "consisting essentially of", "consisting of" or "composed of". In other words, "comprising" the listed steps or options need not be exhaustive.

Except in the examples, or where otherwise explicitly indicated, all numbers in this description indicating amounts of material or conditions of reaction, physical properties of materials and/or use are to be understood as modified by the word "about." All amounts are by weight of the composition, unless otherwise specified.

It is understood that the examples and embodiments described herein are for illustrative purposes only and that various modifications or changes in the light thereof will be suggested to persons skilled in the art and are to be included within the spirit and purview of this application and the scope of the appended claims.

What is claimed is:

1. A process for preparing beverage strength tea from a concentrated aqueous solution of tea comprising the steps of:

forming a tea concentrate having at least about 10% to 30% tea solids;

heating the tea concentrate to a temperature of at least about 160° F.; and diluting the heated tea concentrate with a volume of water sufficient to produce a beverage strength tea of 0.1% to 0.35% tea solids resulting in a final product having a Hunter Haze Value of less than 50 as measured at 60° F. in a 5 cm cell.

2. The method as defined in claim 1 wherein said concentrated tea solution contains about 12% to about 20% tea solids and wherein the dilution to the final product employs about 1 part of tea concentrate to 100 parts of water.

3. The method as defined in claim 1 wherein said concentrated aqueous solution of tea contains about 17% tea solids.

4. The method as defined in claim 1 wherein said concentrated aqueous solution of tea has a total solids concentration of at least about 45% and contains a carbohydrate in a ratio of about 1 part to about 2 parts or more to 1 part of tea.

5. The method as defined in claim 4 wherein said carbohydrate is selected from the group consisting of high fructose corn syrup, corn syrup, sucrose, oligosaccharides and mixture thereof.

6. The method as defined in claim 1 wherein the concentrate has a pH of about 5 or lower.

7. The method as defined in claim 1 wherein deionized water is used for the dilution.

8. The method as defined in claim 1 wherein deionized water is used to prepare the concentrate.

* * * * *